UNITED STATES PATENT OFFICE 2,468,718

METHOD OF MAKING METHYLOL ALKANES

Joseph A. Wyler, Allentown, Pa., assignor to Trojan Powder Company, a corporation of New York No Drawing. Application January 10, 1947, Serial No. 721,469

5 Claims. (Cl. 260—635)

This invention relates to methylol alkanes and particularly to the method of making them with a very low and normally negligible content of dissolved metallic impurity.

It is well known that formaldehyde may be reacted with acetaldehyde in the presence of water and calcium hydroxide to form pentaerythritol and calcium formate as the by-product. In this reaction the proportions of the reacting aldehydes are 4 mols of formaldehyde to 1 mol of the acetaldehyde.

When acetaldehyde is substituted by a higher homolog, as, for instance by propionaldehyde, then the reaction in contact with the aqueous alkali gives a product of the type represented by the formula

in which R represents an alkyl radical and $x$ an integral number within the range 1 to 3. Compounds of this class I call for convenience "methylol alkanes."

With formaldehyde and propionaldehyde in the proportion of 3 mols of the former to 1 mol of the latter, the reaction gives trimethylol ethane, according to the following equation:

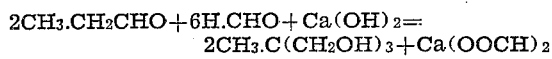

When butyraldehyde is used in place of propionaldehyde, then the R group represented in the specific formulas above by $CH_3$ becomes $C_2H_5$, other parts of the formula remaining unchanged.

When iso-butyraldehyde is used, the product is dimethyl dimethylol methane.

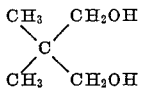

Various methods have been proposed for separating the by-product calcium formate from the principal products of the type shown above.

Although both acetone and calcium formate contain the carbonyl group (CO) and low proportions of carbon and hydrogen and, because of this chemical similarity, the calcium formate should be expected to be appreciably soluble in acetone and although the solubility of the formate in acetone is actually appreciable in the presence of the small proportion of water occurring in the mixture at the time of separating the formate from the methylol alkane, I have now discovered that the presence of the acetone dissolved in methylol alkane lowers the solubility of the calcium formate by-product so that the alkane under certain conditions may be extracted from the formate by acetone, in substantially ash free condition. The fact that the methylol alkanes may be separated in this manner from the calcium formate is particularly surprising in view of the fact that pentaerythritol, the common example of the condensation of formaldehyde with another aldehyde, cannot be effectively separated from calcium formate by acetone extraction.

The surprising effect of acetone in lowering the solubility of the calcium formate in the alkane is shown by the following data. Trimethylol propane, for example, containing as low as 1% of water will hold in solution about 1% of its weight of calcium formate, whereas, in admixture with acetone in the proportion of 1 part of trimethylol propane to 1 part of acetone, by weight, the resulting mixture will dissolve only about 0.1%. If as much as 5% of water is present in the mixture, only about 0.3% of calcium formate is dissolved. Alcohols, such as methyl, ethyl and propyl, although considered to be non-solvents for calcium formate, when substituted for the acetone, do not give a satisfactory separation. Mixtures of the alcohols with the methylol alkane hold too much calcium formate in solution.

Briefly stated, the invention comprises separating methylol alkanes of the kind described from the by-product calcium formate by extraction with a solvent medium containing a low boiling ketone such as acetone in proportion not less than 90 parts for 100 parts of said ketone and water present and within the range 30 to 90 parts for 100 parts of the ketone and trimethylol alkane, provided the proportion of the ketone selected within this range must be that which is adequate to dissolve all of the particular alkane used at the temperature of separation from the metal formate.

When the proportion of the ketone to water is not less than that stated and the proportion to the alkane is not less than stated, then the extraction with the solvent medium gives a liquid phase that after filtering is substantially free from dissolved calcium formate. If, however, such substantially complete freedom from calcium formate is not required, then the proportion of acetone to water may be decreased to 90 parts for 100 of the ketone and water.

The ketone used must be low boiling and water soluble, that is, acetone or methyl ethyl ketone.

For best results the ketone is warmed to a temperature near the boiling point after being mixed with the methylol alkane and calcium formate that are to be separated. This warming promotes dissolving of the alkane. The extract so formed is then filtered from the undissolved calcium formate.

As the aldehyde to be used with the formaldehyde, in the preparation of the mixture of methylol alkane and calcium formate to be separated, there may be used propionaldehyde, n-butyraldehyde, or isobutyraldehyde, it being necessary for the solubility relationships upon which the method depends that the aldehyde (R.CHO) used for reaction be soluble in water. The aldehyde for best results should contain at least 3 and not more than 4 carbon atoms to the molecule.

The aldehyde is used in approximately the theoretical proportion to form with formaldehyde the completely methylolated derivative. Thus there are used 3 mols of formaldehyde for 1 mol of a normal aldehyde containing 3 to 4 carbon atoms and 2 mols of formaldehyde for 1 mol of isobutyraldehyde.

Once the solution of the alkane in the solvent medium has been formed in contact with the undissolved calcium formate, then the separation of the two phases is made by movement of the one phase away from the other, this step being described herein for convenience as filtering. An example of such filtering is the common separation by pressure or gravity on a filtering member. Other examples are settling and decantation or centrifugal filtration in which the liquid phase is forced to move under centrifugal force through and away from the undissolved material which is supported on a cloth or other filtering member.

The invention will be further illustrated by description in connection with the following specific examples of the practice of it.

Example 1

Aqueous formaldehyde and n-butyraldehyde are condensed in contact with suspended calcium hydroxide, in usual manner, to give a mixture of trimethylol propane and by-product calcium formate.

In the step comprising my improvement, the products of the above reaction were neutralized by the addition of formic acid, in approximately the amount equivalent to that part of the lime remaining as such and preferably to very slight acidity, and the resulting clear liquor evaporated to dryness, with stirring. The result was a syrupy residue containing trimethylol propane in large proportion, water to the extent of 0.9%, and fine crystals of calcium formate in suspension in the syrup.

To this syrup, the weight of which was 536 parts, there was added an equal weight of 99% acetone, to decrease the solubility of the formate. The resulting mixture was stirred, warmed to the boiling point of the acetone, then cooled to approximately room temperature, that is below 30° C., and filtered. The crystals of calcium formate, which remained on the filter, were washed twice with small portions of acetone and the washings added to the original filtrate. The combined filtrate and washings were then evaporated, to give a substantially solvent free and calcium formate free product.

This product when hot was a thin syrup. Upon cooling it solidified.

The weight of the product was 95% of the theory for trimethylol propane. It consisted mainly of trimethylol propane $CH_3.CH_2.C(CH_2OH)_3$ with small proportions of di- and monomethylol propane.

Example 2

N-propionaldehyde in the proportion of 58 parts was treated with 844 parts of a 10.6% solution of formaldehyde in water and about 58 parts of calcium hydroxide preslurried with 120 parts of water, the steps in the treatment and details not otherwise given being as stated under Example 1 above.

After the reaction and subsequent evaporation to give the syrup, the syrup was mixed with an equal weight of 99% acetone, the mixture heated with stirring, and then filtered hot, to remove the calcium formate. The calcium formate retained on the filter was washed with fresh portions of acetone and the combined filtrate and washings were evaporated as described under Example 1.

The product consisted mainly of trimethylol ethane of the formula $CH_3.C(CH_2OH)_3$ along with smaller proportions of lower methylolated derivatives.

Example 3

Isobutyraldehyde in the proportion of 144 parts was reacted with 350 parts of a 34.3% solution of formaldehyde, 833 parts of additional water, and 115 parts of calcium hydroxide made into a slurry with 300 parts of water in advance of incorporation into the reaction mixture, the steps in the processing up to and including the evaporation to the syrup stage being as described under Example 1 above.

The syrup so made was then extracted with an equal weight of acetone, the mixture filtered hot, and the filtrate evaporated to dryness, to give crystalline dimethylol dimethylmethane of the formula $(CH_3)_2C(CH_2OH)_2$.

While my purification step works best when the alkali used in the original condensation of the aldehydes is calcium hydroxide, another water soluble alkaline earth metal hydroxide, namely, strontium hydroxide or barium hydroxide, may be substituted in the proportion of equivalent weights. Magnesium hydroxide is too insoluble for use.

In separating trimethylol ethane from the metal formate, best results are obtained when the ketone solution is filtered hot. In the preparation of trimethylol propane, on the other hand, best results are obtained when filtration is made at ordinary temperatures.

In large scale operation the ketone used as solvent is recovered in conventional manner.

When the proportion of acetone is less than 90 parts to 10 of water or less than 30 for 70 of the alkane at the time of the original filtration, when an appreciable content of water is also present, then the ash in the final product becomes objectionably high. If the acetone is above 90 parts for 10 of the alkane, no further benefit results from the use of the extra acetone and the cost of recovery of the acetone is increased.

The methylol alkanes made as described, although the separation from the alkali metal formate is very convenient and economical, are low in ash content, the ash ranging ordinarily only from 0.05% to 0.25%.

The process gives not only methylol alkanes of low percentage of ash which are useful in industry, as in the manufacture of esters for incorporation in printing ink formulas, but also purified calcium formate that is ready for sale as such.

It will be understood also that it is intended to cover all changes and modifications of the examples of the invention herein chosen for the purpose of illustration which do not constitute departures from the spirit and scope of the invention.

What I claim is:

1. In preparing a methylol alkane of the general formula $R_{4-x}C(CH_2OH)_x$, in which R represents an alkyl radical and $x$ an integral number within the range 1 to 3, by the method including reaction of formaldehyde with an aqueous solution of a water soluble aldehyde of the formula R.CHO in contact with a water soluble alkaline earth metal hydroxide, R having the same meaning as above and an alkaline earth metal formate being the by-product, and evaporating the resulting mixture to remove most of the water present, the improvement which comprises dissolving the methylol alkane present in the evaporated mixture in a solvent medium containing a low boiling water soluble ketone in the proportion of at least 90 parts for 100 parts of the ketone and water and 30 to 90 parts of the ketone for 100 parts of the ketone and methylol alkane, the ketone in these proportions in the solvent medium decreasing the solubility of the by-product metal formate in the medium, then filtering the solution from the undissolved formate, and evaporating the solvent medium from the filtrate to leave the methylol alkane as a residue of low ash content.

2. The method described in claim 1, the alkali remaining after completion of the reaction of the aldehydes being neutralized by the addition of formic acid, the ketone used being acetone, and the acetone being maintained at a temperature near its boiling point until the alkane is dissolved.

3. The method described in claim 1, the alkali used being calcium hydroxide partly suspended and partly dissolved in the said solution.

4. The method described in claim 1, the alkali used being calcium hydroxide partly suspended and partly dissolved in the said solution and the said aldehyde being butyraldehyde used in the proportion of about 1 mol to 3 mols of the formaldehyde, so that the alkane made is trimethylol propane.

5. The method described in claim 1, the alkali used being calcium hydroxide partly suspended and partly dissolved in the said solution, the said aldehyde being butyraldehyde used in the proportion of about 1 mol to 3 mols of the formaldehyde, so that the alkane formed is trimethylol propane, and the ketone used being acetone.

JOSEPH A. WYLER.

REFERENCES CITED

The following references are of record in the file of this patent:

UNITED STATES PATENTS

| Number | Name | Date |
|---|---|---|
| 2,275,586 | Fitzky | Mar. 10, 1942 |
| 2,292,926 | Brubaker | Aug. 11, 1942 |
| 2,360,186 | Wyler | Oct. 10, 1944 |